Figure 3:
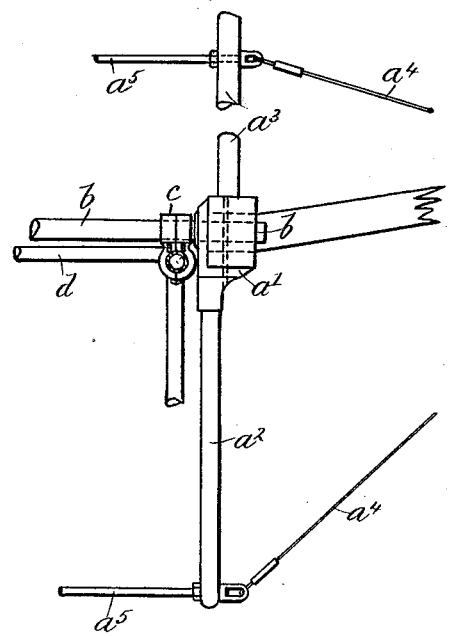

E. PUPIN.
FLYING MACHINE OR AEROPLANE.
APPLICATION FILED NOV. 21, 1910.
1,059,905.
Patented Apr. 22, 1913.
6 SHEETS—SHEET 1.
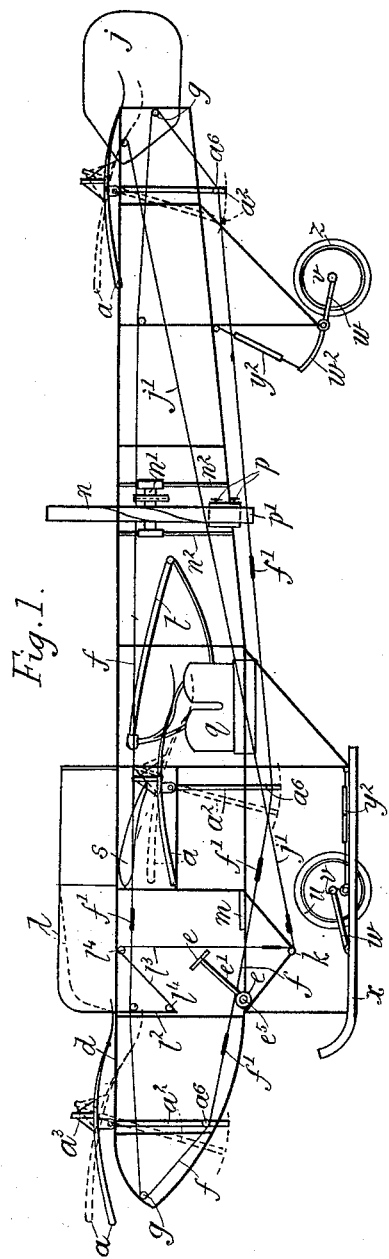
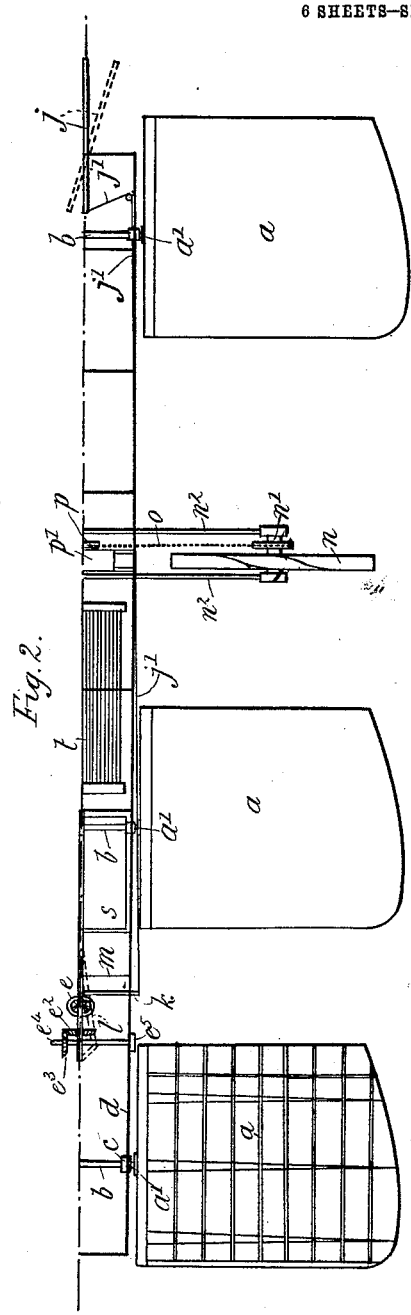

E. PUPIN.
FLYING MACHINE OR AEROPLANE.
APPLICATION FILED NOV. 21, 1910.

1,059,905.

Patented Apr. 22, 1913.
6 SHEETS—SHEET 2.

Witnesses:

Inventor:
Emile Pupin.

E. PUPIN.
FLYING MACHINE OR AEROPLANE.
APPLICATION FILED NOV. 21, 1910.

1,059,905.

Patented Apr. 22, 1913.
6 SHEETS—SHEET 3.

E. PUPIN.
FLYING MACHINE OR AEROPLANE.
APPLICATION FILED NOV. 21, 1910.

1,059,905.

Patented Apr. 22, 1913.
6 SHEETS—SHEET 5.

Witnesses:
H. T. P. Gee
Vollas W. Ward.

Inventor:
Emile Pupin.
by Spear Middleton Donaldson & Spear
By Walter Donaldson
Attorneys.

COLUMBIA PLANOGRAPH CO., WASHINGTON, D. C.

E. PUPIN.
FLYING MACHINE OR AEROPLANE.
APPLICATION FILED NOV. 21, 1910.

1,059,905.

Patented Apr. 22, 1913.
6 SHEETS—SHEET 6.

UNITED STATES PATENT OFFICE.

EMILE PUPIN, OF LONDON, ENGLAND.

FLYING-MACHINE OR AEROPLANE.

1,059,905. Specification of Letters Patent. Patented Apr. 22, 1913.

Application filed November 21, 1910. Serial No. 593,497.

*To all whom it may concern:*

Be it known that I, EMILE PUPIN, citizen of the Republic of France, and residing at 185 Wardour street, London, W., England, have invented certain new and useful Improvements in and Relating to Flying-Machines or Aeroplanes, of which the following is a specification.

This invention has for its chief object to render flying machines or aeroplanes more stable in flight. To this end, the planes, of which there are three or more and each of which is preferably composed of a pair of wings, are arranged on two or more different levels, and means are provided for altering their angle of incidence during flight and before flight. By arranging the planes on different levels, they bear on different layers of air and sustain the flying machine or aeroplane and prevent it coming to the ground more quickly than it is intended to do. The purpose of varying the angle of incidence of the planes during flight is to obtain speeds corresponding to resistance. The angle of incidence of the planes must always be dependent upon:— (a) weight (b) resistance (c) force of propulsion. Naturally after the machine has been flying for several hours and the weight changes, the angle of incidence of the planes must be altered. There is also a difference in the angle of incidence of the planes in ascending and descending. By making the angle of incidence of the planes variable before flight they can, if necessary, each be set to different inclinations so as to place the flying machine or aeroplane under the most favorable conditions as to stability or balance. I provide a keel which is separate from the supporting planes and arranged so that it can be twisted, thereby altering the center of gravity or balance of the flying machine or aeroplane and assisting in stabilizing the same.

In order that this invention may be clearly understood and readily carried into effect, I will proceed to describe the same with reference to the accompanying drawings, wherein—

Figure 4:
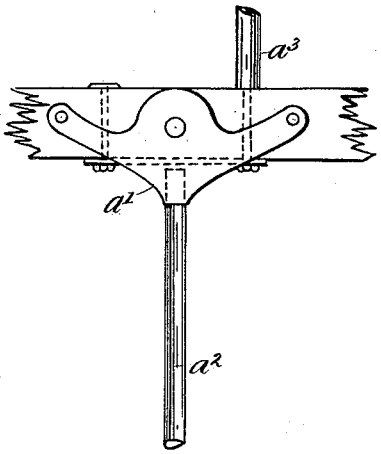
Figure 5:
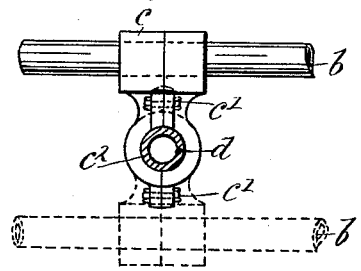
Figure 6:
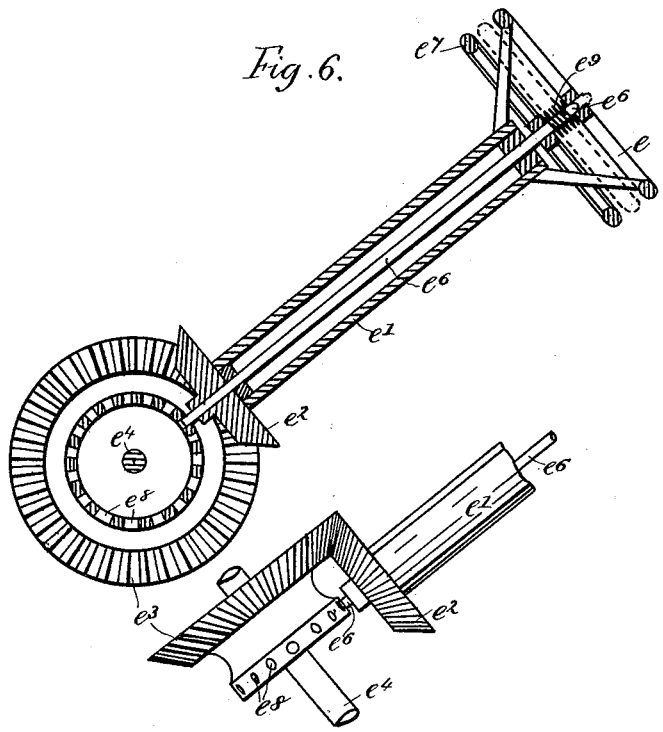
Figure 7:
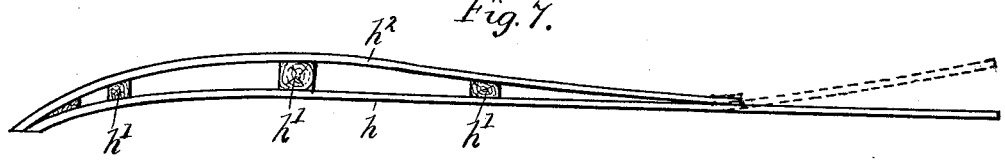
Figure 8:
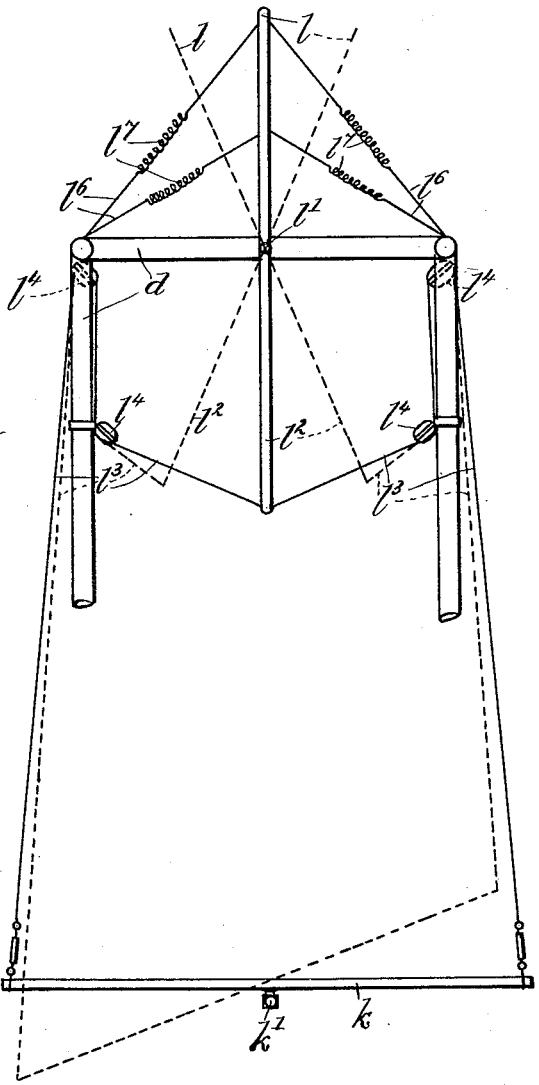
Figure 9:
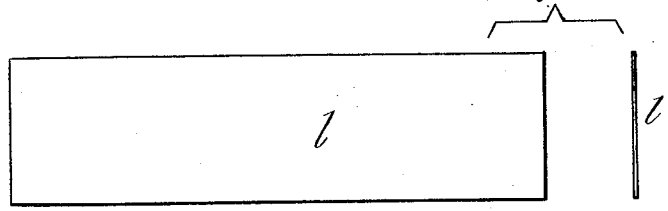
Figure 10:
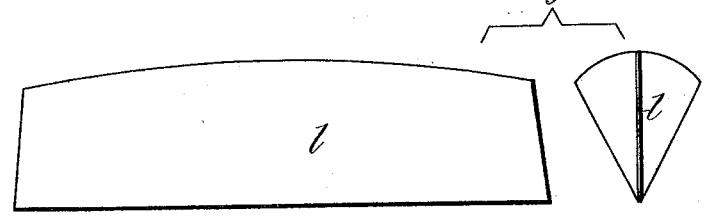
Figure 11:
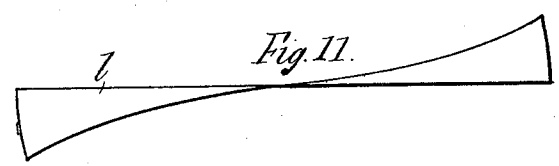
Figure 12:
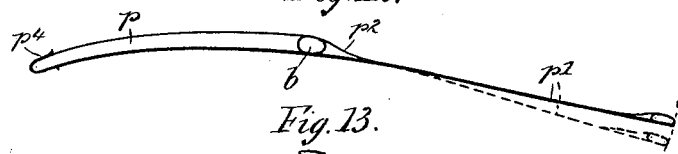
Figure 13:
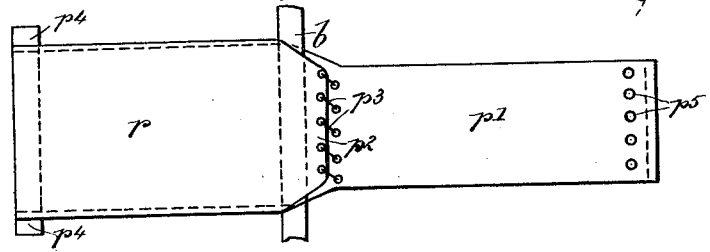
Figure 14:
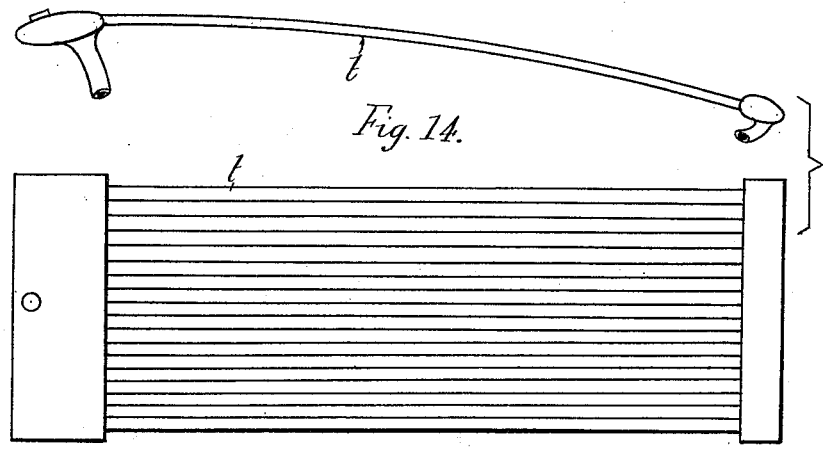
Figure 15:
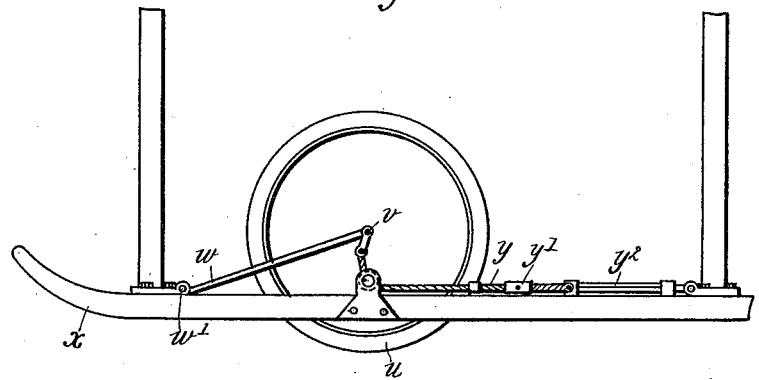

Figure 1 is a side elevation of an aeroplane constructed according to this invention; and Fig. 2 is a plan of one half of Fig. 1, the other half being the same. Fig. 3 shows in front view the method of mounting the wings. Fig. 4 is a side view of part of Fig. 3. Fig. 5 shows a detail of Fig. 3. Fig. 6 is a section partly in elevation of mechanism used in operating the wings. Fig. 7 is a side view of one of the wings. Fig. 8 shows in front view a steadying or balancing plane and its connections. Fig. 9 shows diagrammatically the steadying or balancing plane in side and edge view. Fig. 10 is a similar view to Fig. 9 but shows the plane twisted from both ends. Fig. 11 is a plan of Fig. 10. Figs. 12 and 13 show side view and plan of an auxiliary plane. Fig. 14 shows side view and plan respectively of the engine radiator; and Fig. 15 shows the method of mounting the landing wheels.

Referring to the drawings, I provide the aeroplane with (preferably) three bearing planes, constructed in halves, hereinafter termed "wings" and shown at $a$, $a$, Figs. 1 and 2. Each wing is attached to a bracket $a'$, see also Figs. 3 and 4, which carries a lower arm $a^2$ and an upper arm $a^3$. The wings are supported by wires $a^4$ as usual. The brackets to which the wings are attached are detachably mounted on tubes $b$, $b$, Figs. 1, 2 and 3, which extend across the aeroplane and, as will be well understood, carry a wing at each end, these wings being attached to one another by wires $a^5$, $a^5$. The tubes $b$ are mounted in bearings $c$, $c$, one of which is shown in detail in Fig. 5. These bearings are formed in halves secured together by bolts $c'$, $c'$, and they are clamped on to the top tube of the main frame $d$ which passes through the hole $c^2$ and are capable of being swung on said top tube so as to raise or lower the wings. In Fig. 5 the bearing is shown in broken lines swung downward. The bearings $c$, $c$, being easily removable, can be clamped to any convenient part of the main frame $d$, so that the wings can be readily placed in the best position, horizontally or vertically, for stability of the aeroplane, and for preventing the aeroplane tilting backward, downward, or sidewise, as the center of pressure can be readily adjusted. The wings are readily detachable by being drawn off the ends of the tubes $b$, $b$, so that they can be easily dismantled from the aeroplane and interchanged. I may employ any convenient number of wings, but I prefer three arranged on each side of the aeroplane as shown in Figs. 1 and 2. The front and rear wings are on the same level, while the middle one is lower. The object of this is to enable each plane to rest on a layer of air which is undisturbed, or practically so, by the other planes, the rear plane, although on the same level as the front plane, being too far back to be affected by the latter plane. Variable or adjustable incidence of the planes and variability or adjustability of their center of buoyancy, whereby the aeroplane can be made to very quickly rise and the resistance to advance is reduced, is obtained as follows, reference being had to Figs. 1, 2 and 6: $e$ is a hand-wheel, connected by means of a tube $e'$, to a bevel pinion $e^2$ which gears with a bevel pinion $e^3$ fixed on a shaft $e^4$ mounted in bearings on the main frame $d$. On each end of the shaft $e^4$ is mounted a drum $e^5$ whereon is wound a cable $f$ which is connected to the arms $a^2$ of the wings at a point $a^6$, the cable being passed over pulleys $g, g$ arranged on the main frame $d$. It is to be understood that there is a cable $f$ at each side of the main frame, namely, one for each set of wings. Each of the cables is provided with strainers or tension devices, $e, g.$, right and left handed screw unions $f'$ so that one or more of the wings can be adjusted to advance or retard before flight. Within the tube $e'$ (Fig. 6) is arranged a rod $e^6$ to the upper end of which is fixed a wheel $e^7$, its lower end being adapted to enter recesses $e^8$ formed in the boss of the bevel pinion $e^3$. A spring $e^9$ surrounds the upper end of the rod $e^6$ and it bears at its ends on the bosses of the wheels $e$ and $e^7$ respectively, its function being to normally retain the lower end of the rod $e^6$ locked in one of the recesses $e^8$. When it is desired to alter the angle of incidence of the wings, the wheel $e^7$ is drawn upward by the operator's hands into the position shown in broken lines, whereby the rod $e^6$ is drawn upward clear of the recesses $e^8$, thereby allowing the wheel $e$ and also the bevel pinions $e^2$ and $e^3$ and drums at the ends of the shaft $e^4$ to be turned and so causing the cables to operate all the wings simultaneously. When the incidence of the wings has been adjusted, the wheel $e^7$ is released, and the rod $e^6$ is forced into one of the recesses $e^8$ under the pressure of the spring $e^9$, and so the mechanism for altering the incidence of the wings is locked. Obviously, the wings may be controlled by other means, for instance, a toothed-pinion and rack, screws, universal joints, or worm and worm-wheel.

Referring now to the construction of the wings, this is preferably as shown in Fig. 7, wherein a lower framework $h$ of wood is shown to which is fixed, through the media of cross bars $h'$, an upper and shorter framework $h^2$ also of wood. The rear end of the upper framework is held to the lower framework by means of tape in such a manner as to allow freedom of movement longitudinally of said rear end on the lower framework. During flight, the rear end of the lower framework is forced upward by the air pressure, and, the rear end of the upper framework, being of a yielding nature, slides thereon, so that the rear end of both the upper and lower framework assumes the position shown in broken lines. This flexbility of the rear portion of the wings assists flight and tends to counteract the formation of a vacuum above the wings.

I effect the steering and steadying or balancing operations separately or together by the feet as follows, reference being had to Figs. 1, 2, 8 and 9: The rudder, shown at $j$ (Figs. 1 and 2) is connected to the ends of a bar $k$ by means of a cable $j'$ arranged at each side of the aeroplane, one cable only being shown in Figs. 1 and 2. The steadying or balancing plane or keel stabilizator (hereinafter termed the "keel") the purpose of which is to regulate the center of gravity in order to obtain balance, is shown at $l$ and normally stands upright on the aeroplane, its lower edge being suitably pivoted on the main plane $d$, at about a level with the top tube thereof, by means of pivots arranged at its ends, one of these pivots being shown at $l'$, Fig. 8. The keel may also be supported at about the middle point of its lower edge, if desired. The shape of the keel is clearly shown in Fig. 9. The rear part of the keel is fixed, and its front edge is provided with a downwardly directed arm $l^2$ to the lower end of which are attached cables $l^3$, $l^3$, passing over pulleys $l^4$, $l^4$, which are hung on the main frame, the cables being connected with the ends of the bar $k$. The latter is mounted, by means of a ball and socket joint $k'$ provided at its center on the main frame. The operator sits on the seat $m$ (Fig. 1 and 2) and in order to operate the rudder $j$ he moves the bar horizontally or thereabout with his feet, but in order to operate the keel $l$ he moves the bar vertically or thereabout with his feet, so as to move it in the opposite direction to that in which the aeroplane inclines. If desired, however, the operator can work both the rudder and keel simultaneously by a combined horizontal and vertical movement of the bar $k$. The keel, by being moved as described, rights the aeroplane, and its front portion is moved or twisted toward one side or the other of the aeroplane into some such position as that shown in broken lines in Fig. 1 and the upper portion of Fig. 8. The broken lines shown crossing one another in Fig. 8 indicate the position occupied by the front portion of the keel and by the arm $l^2$ when swung on opposite sides of its central position. Sometimes, however, in accordance with this invention, the keel is operated from both ends, for which purpose it is provided with an arm such as $l^2$ at each end connected up with the bar $k$ through the medium of cables and pulleys as above described excepting that cables which operate the rear of the keel are arranged to pull oppositely to the cables which operate the front of the keel. Thus, when the bar $k$ is connected up to both the front and rear ends of the keel and the latter is operated thereby, the keel assumes the shape shown in Figs. 10 and 11 in which the horizontal lines represent the bottom edge of the keel. The keel is connected to the main frame of the aeroplane by means of wires $l^6$, $l^6$ and helical springs $l^7$, $l^7$, in order that any slackness of the cables by which it is operated may be counteracted. The keel may be actuated through the medium of a hand-wheel, lever or the like, by hand without the use of the rod $k$. The keel may be used for steering if desired, for which purpose it would be placed at a suitable part of the aeroplane and its rear portion would be arranged to swing laterally so as to constitute a rudder. The bar $k$ may be guided at its ends in guides attached to the main frame of the aeroplane.

The aeroplane may, if desired, be provided with more than one keel operated as above described. The keel or keels may be placed in any suitable position on the aeroplane.

The propellers $n$, $n$, shown in Figs. 1 and 2, are arranged one at each side of the aeroplane, and at a distance therefrom so as to be well removed from the center of gravity, and they are conveniently arranged at the level shown in Fig. 1 so as not to unduly disturb the air in the vicinity of the planes. The propellers are driven by means of chains one of which is shown at $o$, connected with spur wheel $p$, $p$, which are arranged in a casing $p'$ and are driven through a suitable shaft (not shown) from the engine $q$. The propellers are geared up so that their upper portions move away from one another. The axles $n'$ on which the propellers are arranged are supported in ball bearings which are mounted eccentrically, (after the fashion of the well known eccentrically mounted bearings of the chain-wheel of tandem bicycles) in order that the tension of the chains $o$ may be adjusted. The arms $n^2$, $n^2$, on which the propellers are mounted, are made readily detachable from the main frame of the aeroplane, so that the position of the propellers can be adjusted to suit requirements.

Between each pair of oppositely disposed wings may be arranged auxiliary surfaces of the construction shown in Figs. 12 and 13, of which the forward part $r$ is rigid, its frame being composed of wood and light metal, and the rear part $r'$ being flexible and unframed. The rear end of the forward part $r$ is furnished with a flap $r^2$ which is placed over the tube $b$ which connects the wings to one another, and is then secured to the rear part $r'$ by means of laces $r^3$. The front edge of the auxiliary surface is provided with hollow extensions $r^4$, $r^4$, which are adapted to receive the contiguous corners of the front edges of the wings, so that the front edges of the auxiliary surfaces $r$, $r'$ and the planes are substantially in line with one another. The back edge of the auxiliary surface is intended to be laced through holes $r^5$, $r^5$, to some suitable part of the main frame of the aeroplane. It will thus be seen that the forward part $r$ moves with the wings to which it is attached. The auxiliary surfaces are readily detachable by undoing the laces above referred to and drawing the hollow extensions $r^4$, $r^4$, off the contiguous corners of the wings. Auxiliary surfaces such as $r$, $r'$, may be arranged at any other suitable part of the aeroplane. These auxiliary surfaces give improved support to the aeroplane, do not offer much friction in flight, and assist in landing the aeroplane safely on the ground. The position of the engine $q$ is adjustable so that it can be easily placed in the best position on the aeroplane.

The petrol tank $s$ (Figs. 1 and 2) is as usual. The engine radiator $t$ is of the shape and arranged on the aeroplane as shown in Figs. 1 and 2, so that it can be utilized as a plane for the purpose of assisting to support the aeroplane. The radiator which is in the form of an unbroken surface, shown in Fig. 14, consists of a number of curved tubes $t$, $t$ arranged close together side by side, these tubes being preferably of oblong section horizontally. The radiator may, however, consist of sheets of corrugated metal arranged face to face and suitably secured together so as to allow passage of the water between them. For this purpose, the corrugations may be arranged so that they are opposed to one another, thereby forming a tubular radiator, or so that they fit into one another, a water passage, however, being left between the sheets. Sometimes, however, I make the radiator in the form of a pipe bent back upon itself several times, so as to comprise lengths of pipe lying side by side, and I may inclose the same between sheets of metal.

As shown in Figs. 1 and 15 the usual front wheels $u$ on which the aeroplane lands have their axles $v$ pivoted in arms $w$ which are hinged at $w'$ to the usual skids $x$. The axles are connected by means of a rope $y$ and tension device $y'$ to a suitable shock-absorber $y^2$. The arm $w$, which carries the usual back wheel $z$, has an extension $w^2$ between which and the main frame of the aeroplane the shock-absorber $y^2$ is secured.

The main frame of the aeroplane is made of steel tubing and the usual wires for stiffening the same are passed through holes formed in the main frame, these holes being lined with soft metal so as to reduce the jar or shock, and so minimize the risk of the stiffening wires breaking.

I claim:

1. In an aeroplane, means for imparting stability thereto comprising three or more supporting planes arranged on two or more different levels, a keel separate from the supporting planes, means for twisting the keel, a rudder, and foot-actuated means connected to the keel and the rudder whereby the keel can be twisted and the rudder turned either at the same time or at different times.

2. In an aeroplane, means for imparting stability thereto comprising three or more supporting planes arranged on two or more different levels, a keel separate from the supporting planes, means for twisting the keel, cables connecting all the said wings together, means for altering the angle of incidence of the wings during flight through the media of said cables, and means such as $f'$ for altering the angle of incidence of one or more of the wings before flight.

In witness whereof I have hereunto set my hand in the presence of two witnesses.

EMILE PUPIN.

Witnesses:
GEORGES HERMONS,
JULES NESSGAS.

Copies of this patent may be obtained for five cents each, by addressing the "Commissioner of Patents, Washington, D. C."